(12) United States Patent
Humphrey

(10) Patent No.: X6308
(45) Date of Patent: Dec. 27, 1830

(54) THRASHING MACHINE

(76) Inventor: Rufus Humphrey

United States Patent Patent No.: X6308

Rufus Humphrey, of Victor, N. York
Letters Patent

The schedule referred to in these Letters Patent, and making part of the same, containing a description in the words of the said Rufus Humphrey him-self, of his improvement in the Thrashing machine –

---

To all to whom these presents shall come: Be it known that I, Rufus Hum-phrey, of the Town of Victor, in the County of Ontario, and State of New York, have invented a new and useful improvement in the machine for Threshing Wheat, rye, rice, and other small grain; and that the following is a full and ex-act description of the construction and operation of the said machine as improved: It differs from all machines of this kind now in use in the simplicity of its machinery, and the cheapness of its construction, it being designed to be propelled by one horse, the horse turns by the customary lever power, a large horizontal wheel, around which is a band, which connects the large horizontal wheel just mentioned, with an upright wheel, on the bottom of which is a set of cogs; one revolution of this large wheel turns the lesser one six times – in the passage of the band which connects these two wheels, are two other wheels against which the band crowds, in that way is always kept in place – if the band stretches or slackens, a wedge throws these two small wheels closer together, and compresses the band around the large wheel –

The cog wheel turns in one revolution (by mashing into a set of cogs of the same size) a shaft placed horizontally under it, eight times – This shaft by a band in the ordinary fashion turns the cylinder of the Threshing machine, in this cylinder the cogs are placed double one behind the other; and close togeth-er, the cylinder revolving eight or nine times as the shaft before mentioned turns once, the rows of teeth on the cylinder, play between similar teeth fixed in the same manner on a bed piece; the cylinder and bed piece are both covered with sheet iron, and the teeth are driven through this, be-tween this bed piece, and the cylinder, the straw to be threshed passes. The machine is fed by an apron leading to the cylinder in the common way.

Witnesses – Samuel H. Lee
Peter A. Mower

Rufus Humphrey

[illegible]